(12) United States Patent
Masschelein et al.

(10) Patent No.: US 12,130,521 B1
(45) Date of Patent: Oct. 29, 2024

(54) WINDOWS WITH LIQUID CRYSTAL LAYERS

(71) Applicant: Apple Inc., Cupertino, CA (US)

(72) Inventors: Peter F Masschelein, Campbell, CA (US); David E Kingman, San Francisco, CA (US); Yunseok Lee, Santa Clara, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 17/989,447

(22) Filed: Nov. 17, 2022

Related U.S. Application Data

(60) Provisional application No. 63/290,585, filed on Dec. 16, 2021.

(51) Int. Cl.
| | |
|---|---|
| *G02F 1/1337* | (2006.01) |
| *B60J 3/04* | (2006.01) |
| *E06B 3/673* | (2006.01) |
| *E06B 9/24* | (2006.01) |
| *G02F 1/1333* | (2006.01) |
| *G02F 1/1343* | (2006.01) |

(52) U.S. Cl.
CPC ......... *G02F 1/133796* (2021.01); *B60J 3/04* (2013.01); *E06B 3/673* (2013.01); *E06B 9/24* (2013.01); *G02F 1/133302* (2021.01); *G02F 1/134363* (2013.01); *E06B 2003/67395* (2013.01); *E06B 2009/2464* (2013.01); *G02F 2202/28* (2013.01)

(58) Field of Classification Search
CPC ............... G02F 1/1347; G02F 1/13471; E06B 2003/67395; E06B 2009/2464; B60J 3/04
See application file for complete search history.

(56) References Cited

U.S. PATENT DOCUMENTS

| | | | |
|---|---|---|---|
| 10,981,358 B2 | 4/2021 | Sadakane et al. | |
| 11,150,521 B2 | 10/2021 | Miura et al. | |
| 2011/0090415 A1* | 4/2011 | Asatryan | G02F 1/1337 |
| | | | 349/33 |

(Continued)

FOREIGN PATENT DOCUMENTS

| | | |
|---|---|---|
| WO | 2015117736 A1 | 8/2015 |
| WO | WO-2016148431 A1 * | 9/2016 |
| WO | 2022058683 A1 | 3/2022 |

*Primary Examiner* — Jessica M Merlin

(74) *Attorney, Agent, or Firm* — Treyz Law Group, P.C.; Kendall P. Woodruff

(57) ABSTRACT

A vehicle or other system may have windows. A window may include an outer glass layer having a concave inner surface and an inner glass layer having a convex inner surface. Transparent conductive electrodes may be formed on the concave inner surface and the convex outer surface. A liquid crystal layer such as a nanocapsule guest-host liquid crystal layer may be interposed between the transparent conductive electrodes. During manufacturing, a first layer of liquid crystal may be coated onto the transparent electrode on the outer glass layer, and a second layer of liquid crystal may be coated onto the transparent electrode on the inner glass layer. The two coated glass layers may then be pressed together in a vacuum chamber so that the first and second liquid crystal layers merge and become a homogenous layer, thereby removing surface irregularities in the liquid crystal layers and reducing undesired haze.

20 Claims, 5 Drawing Sheets

(56) References Cited

U.S. PATENT DOCUMENTS

| | | |
|---|---|---|
| 2014/0141192 A1* | 5/2014 | Fernando .............. E06B 3/6775 |
| | | 156/107 |
| 2016/0193963 A1 | 7/2016 | Anderson et al. |
| 2017/0122028 A1* | 5/2017 | Suzuka .................... E06B 3/67 |
| 2018/0031942 A1* | 2/2018 | Koch ................... G02B 26/026 |
| 2022/0026770 A1 | 1/2022 | Junge et al. |
| 2022/0163836 A1 | 5/2022 | Li et al. |

* cited by examiner

WINDOWS WITH LIQUID CRYSTAL LAYERS

This application claims the benefit of provisional patent application No. 63/290,585, filed Dec. 16, 2021, which is hereby incorporated by reference herein in its entirety.

FIELD

This relates generally to structures that pass light, and, more particularly, to windows.

BACKGROUND

Windows are used in buildings and vehicles. Windows may be formed from glass or other transparent material.

SUMMARY

A vehicle or other system may have windows. Windows may include first and second glass layers. The first glass layer may be a curved outer glass layer having a concave inner surface. The second glass layer may be a curved inner glass layer with a convex inner surface. Transparent conductive electrodes may be formed on the surfaces of the substrates that face each other. The transparent conductive electrodes may be formed from indium tin oxide, silver nanowires, or other transparent conductive material. An electrically adjustable layer such as a guest-host liquid crystal light modulator layer or other electrically adjustable optical component layer may be interposed between the transparent conductive electrodes. The electrically adjustable optical layer may have an electrically adjustable optical characteristic (e.g., adjustable tint, adjustable haze, adjustable polarization, adjustable reflectivity, adjustable color cast, etc.).

The guest-host liquid crystal layer may be a nanocapsule liquid crystal layer having nanocapsules of liquid crystal material. During manufacturing, a first layer of nanocapsule liquid crystal may be spray-coated onto the transparent electrode on the first glass layer, and a second layer of nanocapsule liquid crystal may be spray-coated onto the transparent electrode on the second glass layer. The two coated glass layers may then be pressed together in a vacuum chamber. The heat and pressure applied causes the first and second nanocapsule liquid crystal layers to merge and become homogenous, thereby removing surface irregularities in the nanocapsule liquid crystal layers and reducing undesired haze.

If desired, a conductive layer such as a conductive adhesive layer may be interposed between the first and second nanocapsule liquid crystal layers to serve as a third driving electrode for the two nanocapsule liquid crystal layers.

DETAILED DESCRIPTION

A system may have one or more windows. The system in which the windows are used may be a building, a vehicle, or other suitable system. Illustrative configurations in which the system is a vehicle may sometimes be described herein as an example. This is merely illustrative. Window structures may be formed in any suitable systems.

Windows may include one or more electrically adjustable optical layers for adjusting optical properties of the windows. For example, electrically adjustable windows may be adjusted to change the absorption of light and therefore the light transmission of the windows. An adjustable light modulator layer may, for example, serve as an electrically adjustable sunroof for a rooftop window or may be used to implement an electrically adjustable shade for a side, front, or rear window.

In an illustrative configuration, the transparency and/or tint of the window may be modulated using a liquid crystal light modulator such as a guest-host liquid crystal light modulator. The liquid crystal light modulator may be a nanocapsule liquid crystal layer interposed between transparent electrodes on curved substrates. The electrically adjustable optical layer may provide the window with an electrically adjustable optical characteristic (e.g., adjustable tint, adjustable haze, adjustable polarization, adjustable reflectivity, adjustable color cast, etc.).

A window for the system may include multiple glass layers. For example, a window may include an inner transparent structural layer (sometimes referred to as an inner glass layer) and an outer transparent structural layer (sometimes referred to as an outer glass layer). The nanocapsule liquid crystal layer may be interposed between the inner and outer layers of the window.

During manufacturing, a first layer of nanocapsule liquid crystal may be spray-coated onto the transparent electrode on the first glass layer, and a second layer of nanocapsule liquid crystal may be spray-coated onto the transparent electrode on the second glass layer. The two coated glass layers may then be pressed together in a vacuum chamber. The heat and pressure applied causes the first and second nanocapsule liquid crystal layers to merge and become homogenous, thereby removing surface irregularities in the nanocapsule liquid crystal layers and reducing undesired haze.

Figure 1:
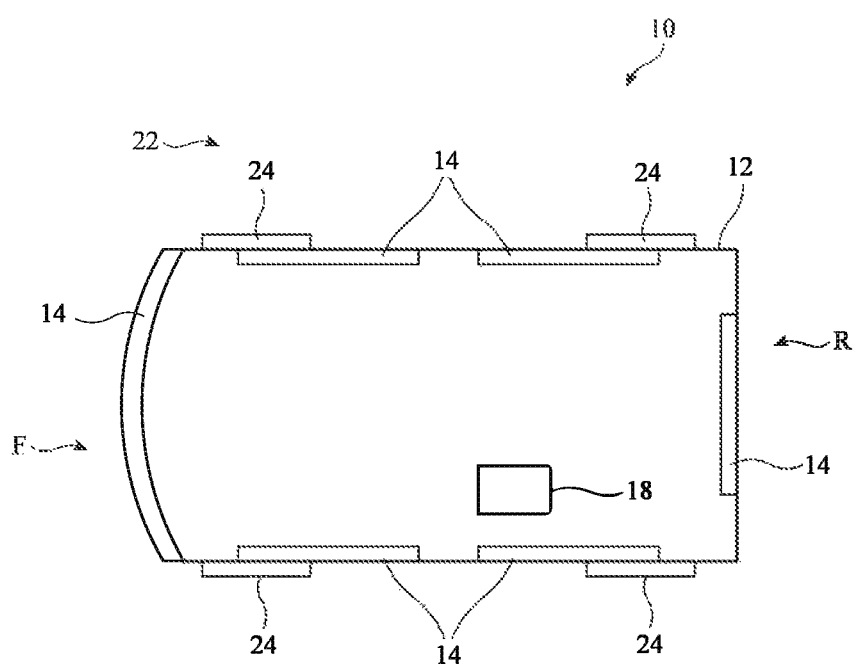
FIG. 1 is a diagram of an illustrative system with windows in accordance with an embodiment.

A cross-sectional top view of an illustrative system that includes windows is shown in FIG. 1. System 10 may be a vehicle, building, or other type of system. In an illustrative configuration, system 10 is a vehicle. As shown in the illustrative top view of system 10 in FIG. 1, system 10 may have support structures such as body 12. Body 12 may be a vehicle body that includes doors, trunk structures, a hood, side body panels, a roof, window pillars, and/or other body structures. Body 12 may be configured to surround and enclose an interior region such as interior region 20. System 10 may include a chassis to which wheels are mounted, may include propulsion and steering systems, and may include a vehicle automation system configured to support autonomous driving (e.g., a vehicle automation system with sensors and control circuitry configured to operate the propulsion and steering systems based on sensor data). This allows system 10 to be driven semi-autonomously and/or allows system 10 to be driven autonomously without a human operator. Manual driving operations may also be supported.

One or more windows such as windows 14 may be mounted within openings in body 12. Windows 14 may, for example, be mounted on the front of body 12 (e.g., to form a front window on vehicle front F), on the rear of body 12 (e.g., to form a rear window at vehicle rear R), on the top (roof) of body 12 (e.g., to form a sun roof), and/or on sides of body 12 (e.g., to form side windows). Windows 14 may include windows that are fixed in place and/or may include windows that can be manually and/or automatically rolled up or down. For example, one or more windows 14 may be controlled using window positioners (e.g., window motors that open and close windows 14 in response to user input or other input). The area of each window 14 may be at least 0.1 $m^2$, at least 0.5 $m^2$, at least 1 $m^2$, at least 5 $m^2$, at least 10 $m^2$, less than 20 $m^2$, less than 10 $m^2$, less than 5 $m^2$, or less than 1.5 $m^2$ (as examples). Windows 14 and portions of body 12 may be used to separate interior region 20 from the exterior environment that is surrounding system 10 (exterior region 22).

System 10 may include components 18. Components 18 may include seats in the interior of body 12, sensors, control circuitry, input-output devices, and/or other vehicle components. Control circuitry in system 10 may include one or more processors (e.g., microprocessors, microcontrollers, application-specific integrated circuits, etc.) and storage (e.g., volatile and/or non-volatile memory). Input-output devices in system 10 may include displays, sensors, buttons, light-emitting diodes and other light-emitting devices, haptic devices, speakers, and/or other devices for providing output and/or gathering environmental measurements and/or user input. The sensors may include ambient light sensors, touch sensors, force sensors, proximity sensors, optical sensors, capacitive sensors, resistive sensors, ultrasonic sensors, microphones, three-dimensional and/or two-dimensional image sensors, radio-frequency sensors, and/or other sensors. Output devices may be used to provide a user with haptic output, audio output, visual output (e.g., displayed content, light, etc.), and/or other suitable output.

During operation, control circuitry in system 10 may gather information from sensors (e.g., environmental sensors) and/or other input-output devices, may gather user input such as voice commands provided to a microphone, may gather touch commands supplied to a touch sensor, may gather button input supplied to one or more buttons, etc. Control circuitry in system 10 may use this input in driving system 10 and in controlling windows and other parts of system 10.

Windows 14 may have one or more planar portions and/or one or more curved portions. As an example, one or more portions of window 14 may be characterized by a curved cross-sectional profile and may have convex and/or concave exterior surfaces (and corresponding concave and/or convex interior surfaces). The curved portions of windows 14 may include curved surfaces that can be flattened into a plane without distortion, which are sometimes referred to as developable surfaces. The curved portions of window 14 may also include curved surfaces with compound curvature, which cannot be flattened into a plane without distortion and which are sometimes referred to as non-developable surfaces or doubly curved surfaces.

Glass layers for windows 14 may be formed by molding glass sheets such as planar sheets of float glass into desired shapes and subsequently laminating these molded sheets together using adhesive. In some arrangements, first and second curved glass layers are provided with transparent conductive electrodes and individually spray-coated with a liquid crystal layer such as nanocapsule liquid crystal layer. The two spray-coated glass layers may then be pressed together in a vacuum chamber. The heat and pressure applied causes the first and second nanocapsule liquid crystal layers to merge and become a single homogenous layer of nanocapsule liquid crystal. Control circuitry in system 10 may be used to apply voltages to the transparent conductive electrodes to adjust the electric field that is applied to the nanocapsule liquid crystal and thereby adjust the tint of the window 14.

Figure 2:
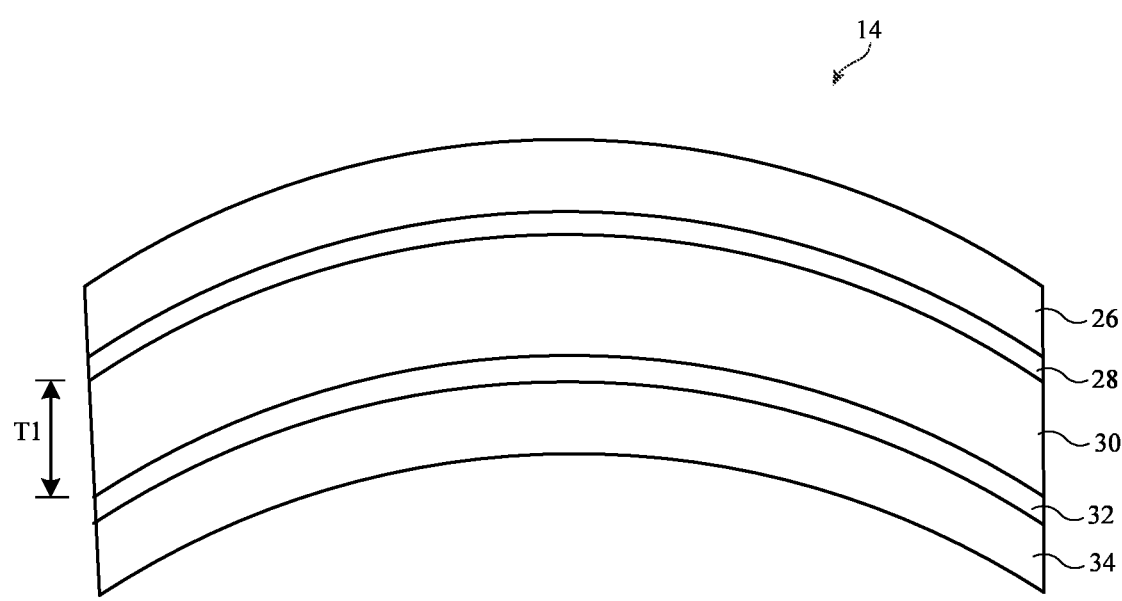
FIG. 2 is a cross-sectional side view of a window having a liquid crystal layer interposed between first and second electrodes on respective first and second substrates in accordance with an embodiment.

An illustrative configuration for a window such as one of windows 14 of FIG. 1 is shown in FIG. 2. As shown in FIG. 2, window 14 may include first and second substrates such as first substrate 26 and second substrate 34. Substrates 26 and 34 may be glass substrates, plastic substrates, and/or substrates formed from other suitable transparent material. Arrangements in which substrates 26 and 34 are formed from glass may be described herein as an illustrative example.

Substrates 26 and 34 may be planar or may be curved. In the example of FIG. 2, substrates 26 and 34 are curved substrates. Outer substrate 26 may have a convex outer surface and opposing concave inner surface. Inner substrate 34 may have a concave outer surface and a convex inner surface. Outer substrate 26 may face the exterior of system 10 while inner substrate 34 faces the interior of system 10. This is merely illustrative, however. If desired, substrate 26 may face the interior of system 10 and substrate 34 may face the interior of system 10.

Layers 26 and 34, which may sometimes be referred to as outer and inner window layers or outer and inner glass layers, may be formed from single-layer glass structures and/or multi-layer glass structures. If desired, these layers may be strengthened (e.g., by annealing, tempering, and/or chemical strengthening). In general, inner glass layer 34 may be a single-layer glass structure (e.g., a single layer of tempered glass) or a laminated glass layer and outer glass layer 26 may be a single-layer glass structure (e.g., a single layer of tempered glass) or a laminated glass layer.

If desired, window 14 may include one or more adjustable optical layers (e.g., an adjustable polarizer, an adjustable reflectivity layer such as an adjustable mirror, an adjustable absorber, which may sometimes be referred to as an adjustable light modulator layer or light modulator layer, a layer exhibiting adjustable color, an adjustable haze layer, and/or other adjustable layers). As an example, window 14 may include adjustable layer 30. Adjustable layer 30 may be, as an example, an electrically adjustable guest-host liquid crystal layer that is adjusted in response to control signals from control circuitry in system 10 via a control input. The guest-host liquid crystal layer can be adjusted to exhibit a higher level of light transmission (e.g., at least 80% or other suitable first amount) or a reduced, lower level of light transmission (e.g., a second amount lower than the first amount such as an amount less than 80%, less than 50%, or less than 20%, as examples).

In arrangements in which adjustable layer 30 is a guest-host liquid crystal light modulator, conductive electrodes such as transparent conductive electrodes 32 and 28 may be formed on the inner surfaces of substrates 34 and 26, respectively. For example, a first transparent conductive electrode 32 may be formed on the convex inner surface of inner substrate 34, and a second transparent conductive electrode 28 may be formed on the concave inner surface of outer substrate 26. Transparent conductive electrodes 32 and 28 may be formed from indium tin oxide, silver nanowires, or other transparent conductive material.

A layer of liquid crystal material such as liquid crystal layer 30 may be interposed between electrodes 32 and 28. Liquid crystal layer 30 may be a nanocapsule liquid crystal layer having nanocapsules or other small spheres containing guest-host liquid crystal material. The guest-host liquid crystal material may have guest dye molecules and host liquid crystal molecules. The dye molecules may have anisotropic light absorption properties. The orientation of the guest dye molecules may be controlled by electrically controlling the orientation of the host liquid crystal molecules (e.g., by using control circuitry in vehicle 10 to adjust the voltage across electrodes 32 and 28). As a result, the light absorption through layer 30 (e.g., visible light absorption) can be electrically adjusted (e.g., providing window 14 with adjustable tint).

When layer 30 is incorporated into window 14, the amount of light that passes through window 14 may be adjusted dynamically during operation of vehicle 10 (e.g., to reduce bright light and thereby dim interior region 22, to block the interior region from the exterior region to enhance privacy, etc.). Window 14 may be a roof-top window, a side window, a front window, or a rear window. If desired, one or more reflective layers may be incorporated into the stack of FIG. 2 to form a mirror in vehicle 10 (e.g., a rear view mirror, a side view mirror, etc.). The mirror may have electrically adjustable tint and/or adjustable reflectivity using layer 30 (e.g., to reduce glare). Arrangements in which the layers of FIG. 2 form a window in vehicle 10 are sometimes described herein as an illustrative example.

In some arrangements, guest-host liquid crystal layer 30 may be a spray-coated layer such as a spray-coated nanocapsule liquid crystal layer. It can be challenging to spray-coat nanocapsule liquid crystals onto a curved surface. If care is not taken, surface irregularities and/or thickness variations in the spray-coated liquid crystal may cause undesired haze in layer 30. To reduce surface irregularities in layer 30 and improve adhesion between substrates 26 and 34, first and second portions of layer 30 may be individually and respectively spray-coated onto substrate 26 and 34. The first and second portions of layer 30 may have a combined thickness that is equal to the resulting desired thickness T1 of layer 30 in window 14. The two spray-coated substrates may be pressed together in a vacuum assembly so that the two portions of layer 30 merge and become homogenous under heat and pressure, thereby forming layer 30 having thickness T1 of FIG. 2. This type of approach is illustrated in the cross-sectional side views of FIGS. 3, 4, and 5.

Figure 3:
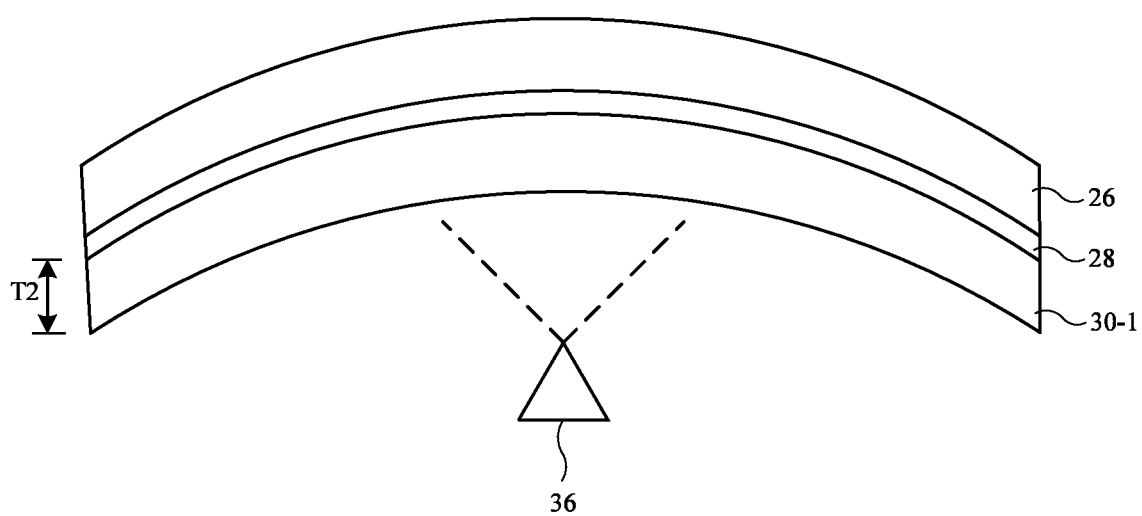
FIG. 3 is a cross-sectional side view of a first substrate having a convex outer surface and a concave inner surface that is spray-coated with a first layer of liquid crystal material in accordance with an embodiment.

As shown in FIG. 3, a coating tool such as coating tool 36 may be used to apply a first layer of liquid crystal material 30-1 (e.g., a first portion of guest-host liquid crystal layer 30 of FIG. 2) to concave inner surface of outer substrate 26. Coating tool 36 may be any suitable coating tool (e.g., a spray coating tool, a screen printing tool, a pad printing tool, a casting tool, etc.). The concave inner surface of outer substrate 26 is covered with transparent conductive electrode 28, so layer 30-1 is applied over transparent conductive electrode 28. Layer 30-1 may have a thickness T2 which is less than thickness T1 of FIG. 2. Thickness T2 may be half of thickness T1 or may be some other portion of T1 (e.g., 75% of thickness T1, 30% of thickness T1, 20% of thickness T1, 60% of thickness T1, and/or any other suitable percentage of thickness T1).

Figure 4:
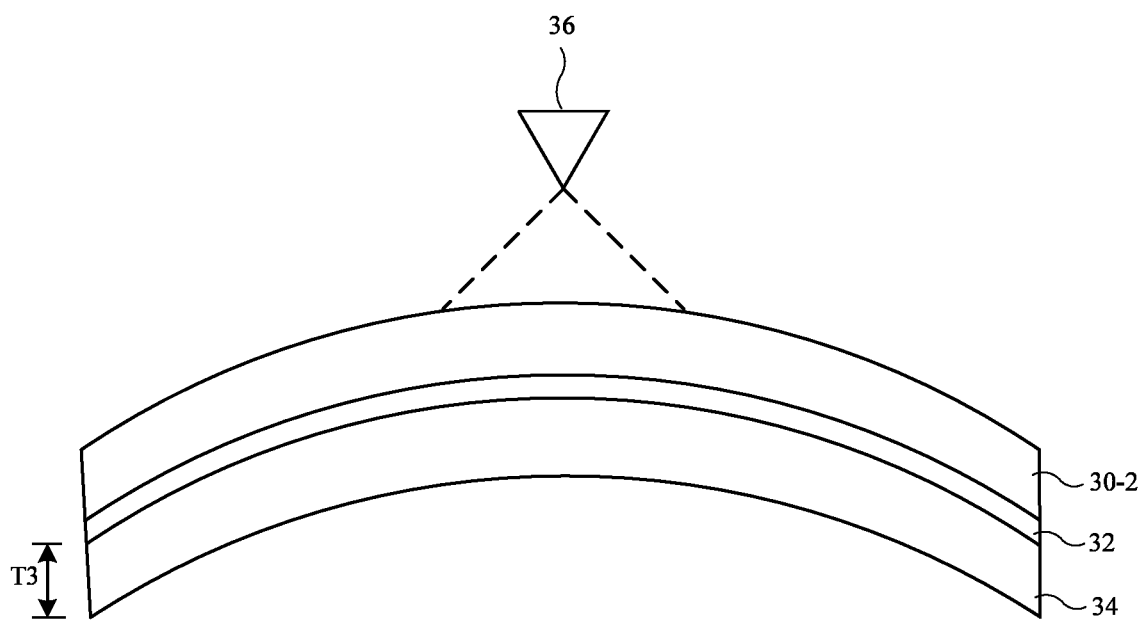
FIG. 4 is a cross-sectional side view of a second substrate having a concave outer surface and a convex inner surface that is spray-coated with a second layer of liquid crystal material in accordance with an embodiment.

As shown in FIG. 4, coating tool 36 may be used to apply a second layer of liquid crystal material 30-2 (e.g., a second portion of guest-host liquid crystal layer 30 of FIG. 2) to convex inner surface of inner substrate 34. The convex inner surface of inner substrate 34 is covered with transparent conductive electrode 32, so layer 30-2 is applied over transparent conductive electrode 32. Layer 30-2 may have a thickness T3 which is less than thickness T1 of FIG. 2. Thickness T3 may be half of thickness T1 or may be any other suitable thickness such that thickness T2 plus thickness T3 is equal to thickness T1.

Figure 5:
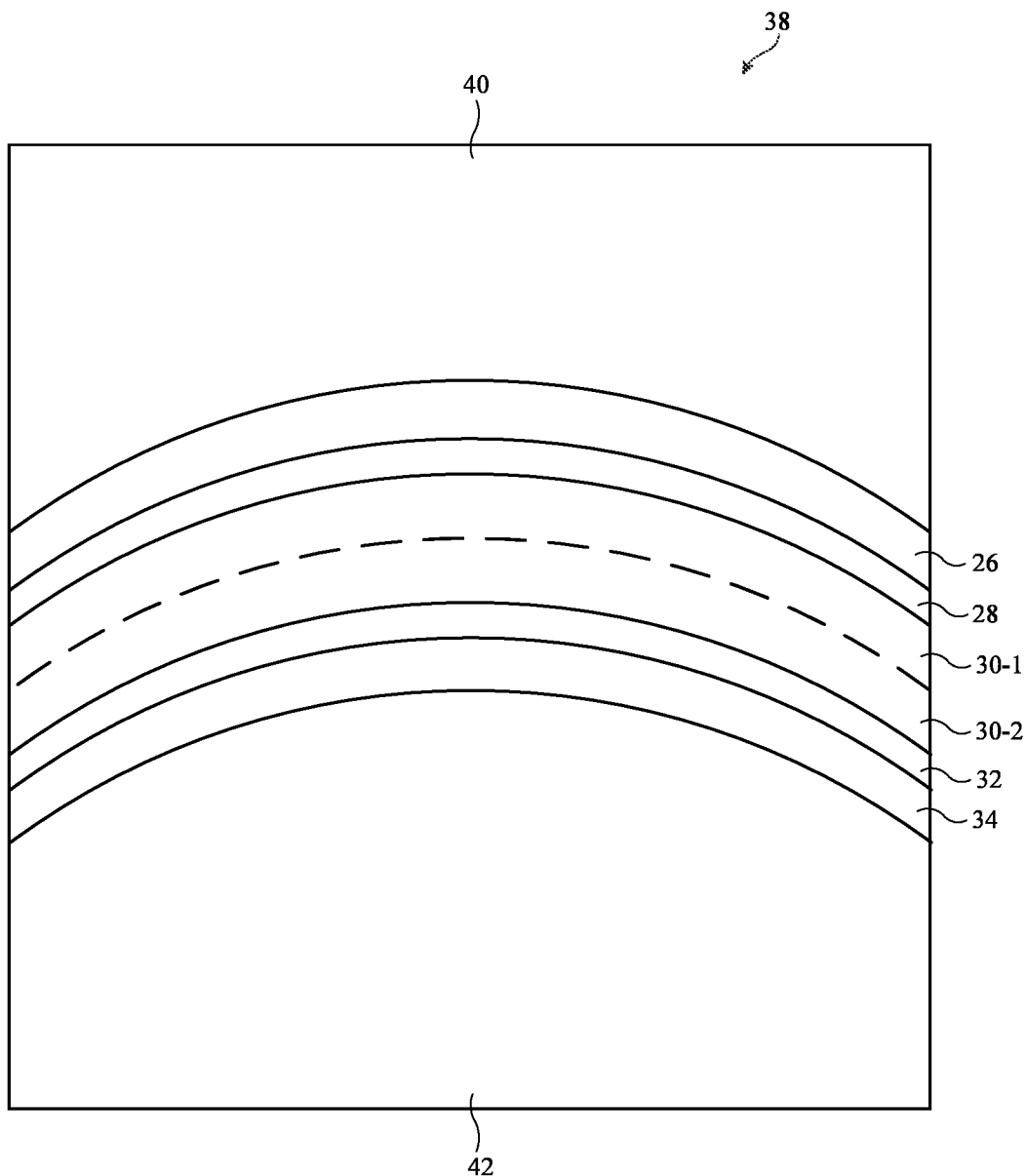
FIG. 5 is a cross-sectional side view of an illustrative vacuum chamber for applying heat and pressure to first and second substrates to merge and homogenize first and second layers of liquid crystal material that are interposed between the first and second substrates in accordance with an embodiment.

After coating substrates 26 and 34 with respective portions 30-1 and 30-2 of liquid crystal layer 30, the coated substrates 26 and 34 may be placed in a vacuum assembly, as shown in FIG. 5.

Vacuum assembly 38 (e.g., a vacuum chamber) of FIG. 5 may include mating dies 40 and 42. One die such as die 40 may have a concave surface and the other die such as die 42 may have a corresponding convex surface. The concave surface of die 40 may receive the convex outer surface of substrate 26, and the convex surface of die 42 may receive the concave outer surface of substrate 34. Under heat and pressure (e.g., pressure formed by moving dies 40 and 42 together), portions 30-1 and 30-2 of liquid crystal layer 30 may be pressed against one another to thereby merge and form a homogenous layer of liquid crystal without surface irregularities. If desired, vacuum tool 38 may be a single-sided tool based on a male pressing die or a female vacuum-pull die and/or other vacuum assembly techniques may be used (e.g., tool 38 may have a slumping mold, may perform gravity-based shaping operations, and/or may otherwise be used in forming molded glass layers). The arrangement of FIG. 5 that shows the use of two mating dies is illustrative.

Figure 6:
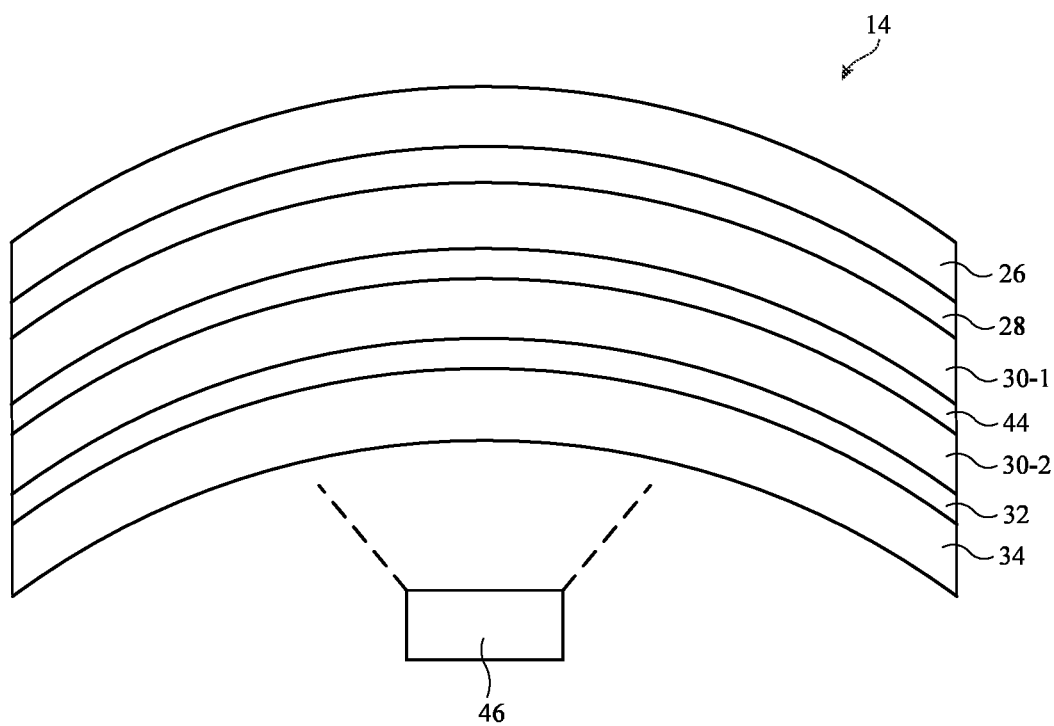
FIG. 6 is a cross-sectional side view of a window having a conductive adhesive layer interposed between first and second layers of liquid crystal material in accordance with an embodiment.

An alternative arrangement for attaching portions 30-1 and 30-2 of liquid crystal layer 30 is shown in FIG. 6. In the example of FIG. 6, an adhesive layer such as conductive adhesive layer 44 may be interposed between liquid crystal portions 30-1 and 30-2 and may be used to attach substrates 26 and 34. Conductive adhesive layer 44 may be an ultraviolet light cured adhesive that is cured with ultraviolet light from light source 46, or conductive adhesive layer 44 may be any other suitable type of adhesive layer (e.g., acrylic adhesive, epoxy, etc.). If desired, adhesive 44 may initially be in liquid form so that the adhesive fills gaps between portion 30-1 and portion 30-2 of layer 30. The use of adhesive layer 44 may compensate for surface irregularities and/or thickness variations in layers 30-1 and 30-2 to reduce undesired haze in window 14.

To help reduce undesired light reflections at the interfaces between layers 30-1, 44, and 30-2, the refractive index of layer 44 between layers 30-1 and 30-2 may have a refractive index value that is matched to that of layers 30-1 and 30-2 (e.g., the refractive index value of layer 44 may differ from the refractive index of layers 30-1 and 30-2 by less than 0.15, less than 0.1, less than 0.05, or less than 0.03 and the refractive index value of the pre-formed non-uniform layer 60 may differ from the refractive index of layer 70 by less than 0.15, less than 0.1, less than 0.05, or less than 0.03).

If desired, conductive adhesive layer 44 may serve as an additional electrode for layers 30-1 and 30-2. Control circuitry in device 10 may apply voltages to electrodes 28 and 44 to adjust electric fields applied to liquid crystal layer 30-1 and may apply voltages to electrodes 32 and 44 to adjust electric fields applied to liquid crystal layer 30-2. If desired, different electric fields may be applied to layers 30-1 and 30-2 to achieve different optical characteristics in layers 30-1 and 30-2. For example, layer 30-1 may exhibit a first amount of light absorption while layer 30-2 may exhibit a second amount of light absorption that is different than the first amount of light absorption. This is merely illustrative, however. If desired, layers 30-1 and 30-1 may exhibit the same amount of light absorption.

The foregoing is merely illustrative and various modifications can be made to the described embodiments. The foregoing embodiments may be implemented individually or in any combination.

What is claimed is:

1. A method for forming a window, comprising:
    coating a first transparent substrate with a first liquid crystal layer;
    coating a second transparent substrate with a second liquid crystal layer; and
    in a vacuum chamber, pressing the first and second substrates together, wherein the first and second liquid crystal layers are separated from one another by a conductive adhesive having a first surface contacting the first liquid crystal layer and a second surface contacting the second liquid crystal layer and wherein the conductive adhesive has a refractive index that differs from a refractive index of the first and second liquid crystal layers by less than 0.15.

2. The method defined in claim 1 wherein the first and second transparent substrates comprise glass.

3. The method defined in claim 1 wherein the first and second transparent substrates are curved.

4. The method defined in claim 1 wherein the first transparent substrate comprises a concave inner surface, the method further comprising:
    forming a first transparent conductive electrode on the concave inner surface.

5. The method defined in claim 4 wherein the second transparent substrate comprises a convex inner surface, the method further comprising:
    forming a second transparent conductive electrode on the convex inner surface.

6. The method defined in claim 5 wherein coating the first transparent substrate with the first liquid crystal layer comprises spray-coating the first liquid crystal layer onto the first transparent conductive electrode.

7. The method defined in claim 6 wherein coating the second transparent substrate with the second liquid crystal layer comprises spray-coating the second liquid crystal layer onto the second transparent conductive electrode.

8. The method defined in claim 5 wherein the first and second transparent conductive electrodes comprise a material selected from the group consisting of: indium tin oxide and silver nanowire.

9. The method defined in claim 1 wherein the first and second liquid crystal layers comprise guest-host liquid crystal material.

10. The method defined in claim 9 wherein the guest-host liquid crystal material is located in nanocapsules.

11. A method for forming a window, comprising:
    coating a first glass layer with a first liquid crystal layer;
    coating a second glass layer with a second liquid crystal layer;
    attaching the first and second glass layers using a transparent conductive adhesive that is interposed between the first and second liquid crystal layers and that has a first surface contacting the first liquid crystal layer and a second surface contacting the second liquid crystal layer, wherein the conductive adhesive has a refractive index that differs from a refractive index of the first and second liquid crystal layers by less than 0.15.

12. The method defined in claim 11 wherein the first and second liquid crystal layers comprise nanocapsules of guest-host liquid crystal material.

13. The method defined in claim 12 further comprising:
    forming a first electrode on the first glass layer; and
    forming a second electrode on the second glass layer.

14. The method defined in claim 13 further comprising:
    curing the transparent conductive adhesive with ultraviolet light.

15. A window for a vehicle, comprising:
    a first transparent substrate having a concave inner surface;
    a second transparent substrate having a convex inner surface;
    a first liquid crystal layer on the concave inner surface;
    a second liquid crystal layer on the convex inner surface; and
    a conductive adhesive interposed between the first and second liquid crystal layers, wherein the conductive adhesive has a first surface contacting the first liquid crystal layer and a second surface contacting the second liquid crystal layer and wherein the conductive adhesive has a refractive index that differs from a refractive index of the first and second liquid crystal layers by less than 0.15.

16. The window defined in claim 15 further comprising:
    a first transparent conductive electrode interposed between the first transparent substrate and the conductive adhesive, wherein the first transparent conductive electrode and the conductive adhesive are configured to adjust a first electric field applied to the first liquid crystal layer.

17. The window defined in claim 16 further comprising:
    a second transparent conductive electrode interposed between the second transparent substrate and the conductive adhesive, wherein the second transparent conductive electrode and the conductive adhesive are configured to adjust a second electric field applied to the second liquid crystal layer.

18. The window defined in claim 17 wherein the first and second transparent substrates comprise glass.

19. The window defined in claim 15 wherein the first and second liquid crystal layers comprise guest-host liquid crystal material.

20. The window defined in claim 19 wherein the guest-host liquid crystal material is located in nanocapsules.

* * * * *

UNITED STATES PATENT AND TRADEMARK OFFICE
CERTIFICATE OF CORRECTION

| | | |
|---|---|---|
| PATENT NO. | : 12,130,521 B1 | Page 1 of 1 |
| APPLICATION NO. | : 17/989447 | |
| DATED | : October 29, 2024 | |
| INVENTOR(S) | : Peter F Masschelein, David E Kingman and Yunseok Lee | |

It is certified that error appears in the above-identified patent and that said Letters Patent is hereby corrected as shown below:

In the Claims

Column 8, Line 22, "A window for a vehicle" should read -- A window --

Signed and Sealed this
Seventeenth Day of December, 2024

Derrick Brent
*Acting Director of the United States Patent and Trademark Office*